Jan. 11, 1949. M. L. JEFFREY 2,459,078
SHOCK ABSORBENT STOP FOR SOLENOIDS
Original Filed May 23, 1945
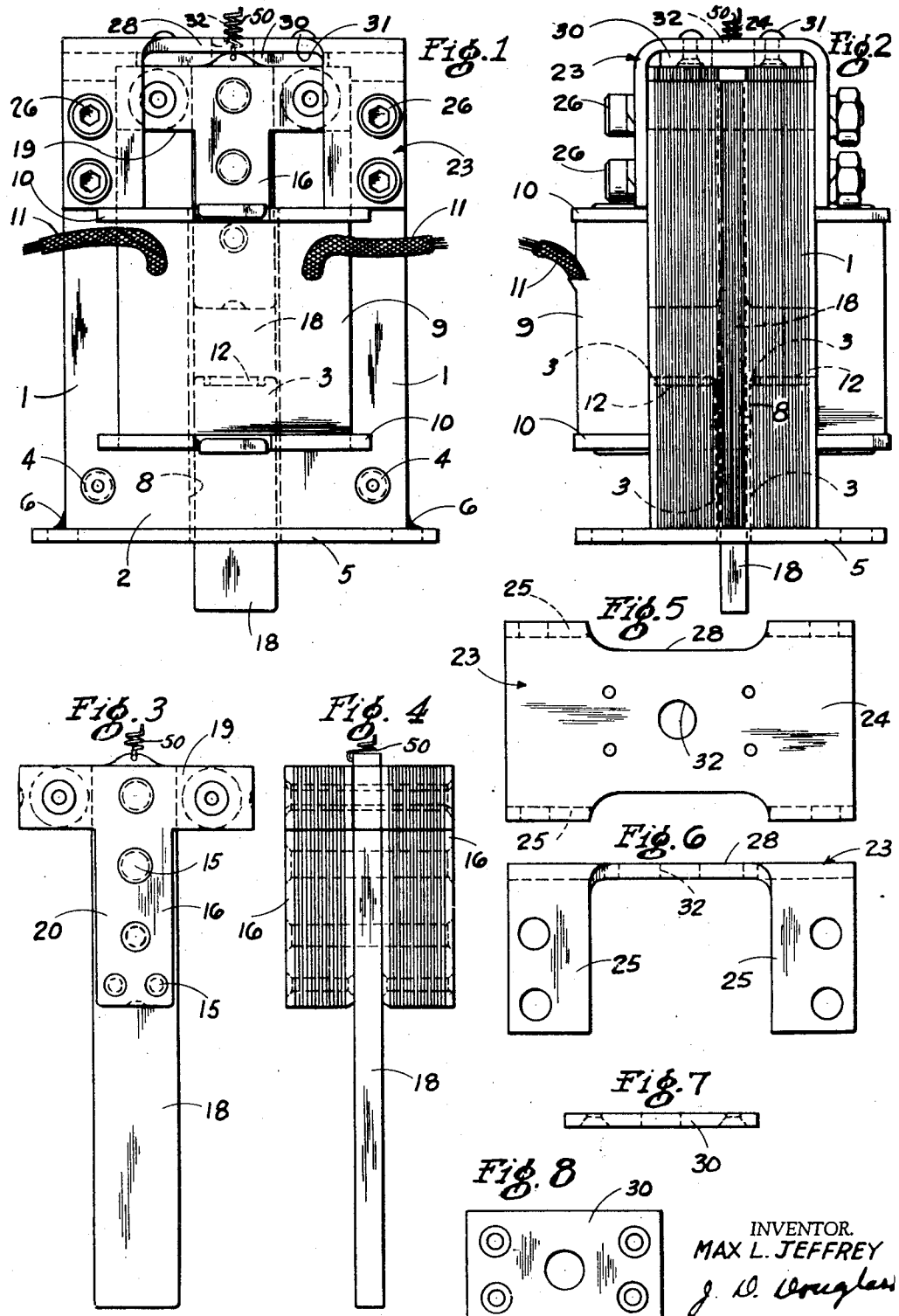
INVENTOR.
MAX L. JEFFREY
ATTORNEY Patented Jan. 11, 1949

2,459,078

UNITED STATES PATENT OFFICE 2,459,078

SHOCK ABSORBENT STOP FOR SOLENOIDS

Max L. Jeffrey, Shaker Heights, Ohio

Continuation of application Serial No. 595,290, May 23, 1945. This application August 4, 1947, Serial No. 766,055

11 Claims. (Cl. 175—341)

This invention relates to electromagnets, and more particularly to an electromagnet of the type known as a solenoid. It is a continuation of my copending application, Serial No. 595,290, filed May 23, 1945, now abandoned.

It is well known to those versed in the art that solenoids of the character about to be described may include a winding, the center of which is open, and the flux of which is reinforced by the provision of stator laminations which usually extend around the opposite sides of the winding. In some instances, the laminations are E shaped, and the center leg extends for a short distance into the open core. A movable member commonly referred to as an armature is provided, also of laminated construction, having a stem adapted to be attracted upon energization, into the winding. The armature may be connected to various mechanisms to effect the operation thereof. It may be used to push or to pull, which operation may be effected when the armature is attracted into the core.

Movement of the armature out of the core is usually effected by some mechanism aside from the solenoid; in some cases this may be by a spring; that is, the armature is attracted into the winding upon energization and may be withdrawn from the winding by spring means. In either event, the movement is sudden and accompanied by considerable shock at the end of the travel of the armature.

It will also be apparent that it is desirable to guide the travel of the armature as well as to provide a means for limiting the travel thereof when it is withdrawn from the winding.

By my present invention, I have provided means for guiding the armature in its travel as well as means to limit the outward movement, which means also absorbs the shock due to the sudden outward travel.

These and other aspects of the invention will become more apparent from the following description of an embodiment thereof, which is illustrated by the accompanying drawings, and forms a part of the specification.

In the drawings:
Fig. 1 is a front elevational view with certain hidden parts shown by dash lines;
Fig. 2 is a side elevational view thereof;
Fig. 3 is a front elevational view of the armature removed from the assembly;
Fig. 4 is a side elevational view thereof;
Fig. 5 is a top plan view of a saddle or yoke removed from the assembly.
Fig. 6 is a side elevational view thereof;

Fig. 7 is an elevational view of a shock absorbing pad, removed from the assembly, and
Fig. 8 is a plan view thereof.

In carrying out my invention, I preferably provide a stator having a winding for energizing it. The stator includes outer poles which extend beyond the winding at one end. An armature is provided having a stem portion adapted to be attracted into the winding and a head on the end of the stem which extends in proximity to the outer poles to provide a low reluctance path for the magnetic flux. Means is provided, which may be carried by the outer poles, that serves as a guide for the armature and also as a means for limiting the outward travel of the armature. Means is also provided which absorbs the shock when the armature is stopped in its outward travel.

More specifically, as can best be seen from the drawings, the stator assembly includes a plurality of thin laminations of generally E shape comprising the outer legs 1, the end portion 2 and the short inner pole 3. The base of the lamination may be secured together by bolts or rivets 4 and is held to a base plate 5 by welding as indicated at 6. A portion of the laminations at the center have the center pole part 3 and the base portion in prolongation thereof removed, as can best be seen in Figs. 1 and 2, to provide an opening 8 which permits an extension of the armature to operate therethrough.

A winding 9 is provided, being disposed on a suitable form, the end flanges of which are shown at 10, being notched for engagement with the sides of stator poles 1. The winding is telescoped over the short pole 3 which extends for a short distance into the winding. Leads 11 are provided for connection to a source of current for energizing the winding.

Inserts 12 of material such as "Stellite," an alloy of cobalt, chromium and tungsten, are provided in the end face of the center pole parts 3 which hold the ends of laminations securely together and prevent mushrooming thereof when the armature strikes them. This structure is covered by Patent No. 2,239,269, of April 22, 1941.

The armature is best shown in Figs. 3 and 4, and comprises a plurality of thin laminations of T shape clamped together by rivets or bolts 15, which extend through heavy outer plates 16. A connecting member is provided and comprises a heavy solid bar 18 which is also clamped together with the laminations being disposed centrally therebetween. The T-shaped formation of the armature provides a head 19 which has portions extending laterally from the stem 20. The connector 18 extends in prolongation of the stem 20, the stem 20 adapted to be movable into and out of the winding 9 and the connector 18 extending through the opening 18 and beyond the base plate 5, which is provided with an opening that allows the member to extend therethrough.

The end of the stem 20 is provided with "Stellite" inserts in the manner described in the aforesaid patent.

As previously mentioned, the head 19 is provided with laterally extending portions which extend in close proximity to the poles 1 to provide a low reluctance path for the magnetic lines of force.

Means is provided to clamp the upper ends of the stator laminations, guide the armature, hold the winding in place, serve as a stop for limiting the outward movement of the armature and to sustain the shock of the outward movement, comprising a saddle or yoke 23 best shown in Figs. 5 and 6. This comprises a body portion 24 provided with pairs of legs 25 on opposite ends which extend downward in spaced parallel relation to each other. This member is preferably made of a stamping of sheet metal, and the legs 25 extend on opposite sides of the poles 1 and are secured thereto and clamp the pole laminations therebetween by bolts 26. It will be noted, as can best be seen from Fig. 1, that the legs are wider than the pole pieces, extending inwardly to provide a channel therebetween, the walls of which serve as a guide for the armature head 19. The ends of the legs also extend downward into engagement with the flange 20 of the winding form to hold the winding securely in place.

As shown in Fig. 5, the top portion 24 is cut away at 28 so that this bridging portion is somewhat narrower than the width of the armature head as viewed in Fig. 4. This enables a mechanical connection to be made to the armature if so desired.

A pad of leather 30, or other suitable shock absorbing substance, shown in Figs. 7 and 8, is secured to the under side of the portion 24 of the saddle by rivets 31. An opening 32 is provided through the member 23 and the pad through which a connection with the armature may be made if desired. Connection can also be made in any desired manner to the part of the stem 18 which extends through the base of the solenoid.

In operation, when the winding is energized, the stem 20 is attracted into the winding, and the armature moves downward as viewed in the figures, the head being guided by the sides of the channel formed by the saddle member 23. The member 18 then protrudes still further beyond the base.

When the winding is de-energized, means which may be a spring 50 connected to the armature head through the opening 32 or to the side of the armature, snaps the armature back to its de-energized position, which is the position shown in the figures. The momentum gained by the armature, which has considerable weight, causes it to impact solidly against the pad 30 which absorbs the shock due to the sudden stopping of the armature in its travel.

I have found that with this structure, which absorbs and distributes the shock evenly to both legs of the stator and over a wide area, the impacts of the armature during operation do not tend to loosen the laminations and destroy the effectiveness of the devices as has been the case with prior structure. The life of the structure is therefore indefinitely prolonged. The manner in which the head is guided not only affords a smooth and positive operation but is easy to construct and economical to manufacture. The structure also lends itself to embodying the solenoid in various mechanisms.

Having thus described my invention in an embodiment thereof, I am aware that numerous and extensive departures may be made therefrom without departing from the spirit and scope of the appended claims.

I claim:

1. An electromagnet comprising a laminated soft iron stator of generally E shape, a winding for said stator, said stator having an inner pole extending into said winding and outer poles extending beyond the winding, a saddle member for connection to said outer poles having a portion on each end formed to provide spaced parallel walls embracing each of said poles and extending beyond the inner face of each of said poles to form parallel guide surfaces, an armature for said magnet having a core portion for extension and attraction into said winding and a head carried thereby for guiding engagement with said guide surfaces, said saddle member being formed with a bridge portion connecting said parallel walls.

2. An electromagnet comprising a laminated soft iron stator of generally E shape, a winding for said stator, said stator having an inner pole extending into said winding and outer poles extending beyond the winding, a saddle member for connection to said outer poles having a portion on each end formed to provide spaced parallel walls embracing each of said poles to form parallel guide surfaces, an armature for said magnet having a core portion for extension and attraction into said winding and a head carried thereby for guiding engagement with said guide surfaces, said saddle member being formed with a bridge portion connecting said parallel walls adapted for engagement by said armature head.

3. An electromagnet comprising a laminated soft iron stator of generally E shape, a winding for said stator, said stator having an inner pole extending into said winding and outer poles extending beyond the winding, a saddle member for connection to said outer poles having a portion on each end formed to provide spaced parallel walls embracing each of said poles to form parallel guide surfaces, and armature for said magnet having a core portion for extension and attraction into said winding and a head for guiding engagement with said guide surfaces, said saddle member being formed with a bridge portion connecting said parallel walls adapted for engagement by said armature head and shock absorbing means interposed between the saddle and the armature head.

4. An electromagnet comprising a laminated soft iron stator, a winding for said stator, said stator having outer poles extending beyond the winding, a saddle member for connection to said outer poles having a portion on each end formed to provide spaced parallel walls embracing each of said poles, an armature for said magnet having a core portion for extension and attraction into said winding and a head for said core, said saddle member being formed with a bridge portion connecting said parallel walls adapted for engagement by said armature head, and shock absorbing means carried by said saddle interposed between the under side of the saddle and the armature head.

5. An electromagnet comprising a laminated soft iron stator, a winding for said stator, said stator having outer poles extending beyond the ends of the winding, a saddle member for connection to said outer poles having a portion on each end formed to provide spaced parallel walls embracing each of said poles and extending beyond the inner face of each of said poles to form parallel guide surfaces, an armature for said magnet having a core portion for extension and attraction into said winding and a head for guiding engagement with said guide surfaces, said saddle member being formed with a bridge portion connecting said parallel walls adapted for engagement by said armature head and shock absorbing means carried by said saddle interposed between the under side of the saddle and the armature head and composed of a pad of shock absorbing material secured to said saddle.

6. An electromagnet comprising a stator and a winding therefor, said stator being formed of iron laminations and providing poles extending into and around the winding on opposite sides thereof and extending beyond the winding on opposite sides, an armature for said magnet including a stem portion adapted to move into said winding and a head portion bridging the space between said extensions, a saddle comprising portions for embracing said stator extensions and holding them together, said embracing portions extending beyond the edges of the laminations to provide guide channels therebetween for guiding the head of said armature, and means to restrict the outward movement of said head comprising a bridging portions extending between said embracing portions, and shock absorbing means carried on the underside of said bridge adapted for engagement with head of the armature.

7. An electromagnet comprising a stator and a winding therefor, said stator being formed of iron laminations and providing poles extending around the winding on opposite sides thereof and extending beyond the winding on opposite sides, an armature for said magnet including a stem portion adapted to move into said winding and a head portion bridging the space between said extensions, a saddle secured to said stator extensions and means to restrict the outward movement of said armature head comprising a shock absorbing pad carried on the underside of said saddle adapted for engagement with head of the armature.

8. An electromagnet comprising a laminated soft iron stator, a winding for said stator, said stator having outer poles extending beyond the ends of the winding, a saddle member for connection to said outer poles having a portion on each end formed to provide spaced parallel walls embracing each of said poles and extending beyond the inner face of each of said poles to form parallel guide surfaces and extending into engagement with the end of said winding, an armature for said magnet having a core portion for extension and attraction into said winding and a head for guiding engagement with said guide surfaces, said saddle member being formed with a bridge portion connecting said parallel walls adapted for engagement by said armature head, and a shock absorbing means, carried by said saddle interposed between the under side of the saddle and the armature head, composed of a pad of shock absorbing material secured to said saddle.

9. An electromagnet comprising a laminated soft iron stator, a winding for said stator including a form for carrying the winding having end flanges for engagement with the stator, said stator having outer poles extending beyond the winding, a saddle member for connection to said outer poles having a portion on each end formed to provide spaced parallel walls embracing each of said poles to form parallel guide surfaces and extending into holding engagement with said winding form, an armature for said magnet having a core portion for extension and attraction into said winding and a head for guiding engagement with said guide surfaces, said saddle member being formed with a bridge portion connecting said parallel walls adapted for engagement by said armature head, and shock absorbing means carried by said saddle, interposed between the under side of the saddle and the armature head.

10. An electromagnet comprising a stator and a winding therefor, said stator being formed of iron laminations and providing poles extending on opposite sides of the winding and beyond the winding on opposite sides, an armature for said magnet including a stem portion adapted to move into said winding upon energization of the winding, a head portion for said stem, and means to restrict the outward movement of said armature comprising a saddle secured to said stator, a shock absorbing member carried on the underside of said saddle adapted for engagement with said head and means to withdraw said armature from said winding upon de-energization of said winding.

11. An electromagnet comprising a stator and a winding therefor, said stator being formed of iron laminations and providing poles extending around and beyond the winding on opposite sides thereof, an armature for said magnet including a stem portion adapted to move into said winding upon the energization of the winding and a head portion bridging the space between said extensions, spring means connected to said armature to urge it out of said winding upon de-energization of the winding, means to restrict the outward movement of said armature comprising saddle portions embracing said stator extensions, said embracing portions extending beyond the edges of the laminations, a bridging portion extending between said embracing portions, and shock absorbing means carried on the underside of said bridge adapted for engagement with head of the armature and relieve the shock of outward movement thereof.

MAX L. JEFFREY.

REFERENCES CITED

The following references are of record in the file of this patent:

UNITED STATES PATENTS

| Number | Name | Date |
|---|---|---|
| 2,152,300 | Bossard | Mar. 28, 1939 |
| 2,360,744 | Van Valkenburg et al. | Oct. 17, 1944 |
| 2,428,712 | Kipke | Oct. 7, 1947 |